United States Patent
Schiocchet et al.

(10) Patent No.: US 12,193,022 B2
(45) Date of Patent: Jan. 7, 2025

(54) DISCONTINUOUS RECEPTION IN JITTER-AFFECTED SCENARIOS

(71) Applicant: QUALCOMM Incorporated, San Diego, CA (US)

(72) Inventors: Marcelo Schiocchet, San Diego, CA (US); Amrit Kharel, San Diego, CA (US); Kausik Ray Chaudhuri, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 17/658,569

(22) Filed: Apr. 8, 2022

(65) Prior Publication Data

US 2023/0328741 A1 Oct. 12, 2023

(51) Int. Cl.
*H04W 72/23* (2023.01)
*H04W 76/28* (2018.01)

(52) U.S. Cl.
CPC ........... *H04W 72/23* (2023.01); *H04W 76/28* (2018.02)

(58) Field of Classification Search
CPC .............................. H04W 72/23; H04W 76/28
See application file for complete search history.

(56) References Cited

U.S. PATENT DOCUMENTS

| | | | |
|---|---|---|---|
| 2020/0146098 A1* | 5/2020 | Dhanapal | H04W 16/14 |
| 2020/0259601 A1* | 8/2020 | Zhou | H04L 5/0087 |
| 2020/0288531 A1* | 9/2020 | Iyer | H04L 1/18 |
| 2023/0026953 A1* | 1/2023 | Zhang | H04W 76/38 |
| 2023/0038500 A1* | 2/2023 | Lin | H04W 76/27 |

* cited by examiner

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive, in an active state, a set of downlink grants or a set of uplink grants. The UE may transition from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time. Numerous other aspects are described.

28 Claims, 10 Drawing Sheets

DISCONTINUOUS RECEPTION IN JITTER-AFFECTED SCENARIOS

FIELD OF THE DISCLOSURE

Aspects of the present disclosure generally relate to wireless communication and to techniques and apparatuses for discontinuous reception in jitter-affected scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LIE, NR, and other radio access technologies remain useful.

SUMMARY

Some aspects described herein relate to a method of wireless communication performed by a user equipment (UE). The method may include receiving, in an active state, a set of downlink grants or a set of uplink grants. The method may include transitioning from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time.

In a first aspect, the set of threshold conditions includes the quantity of downlink grants in the set of downlink grants satisfying a threshold. In a second aspect, alone or in combination with the first aspect, the set of threshold conditions includes the quantity of uplink grants in the set of uplink grants satisfying a threshold. In a third aspect, alone or in combination with one or more of the first and second aspects, the set of threshold conditions includes the inactivity time satisfying an inactivity time threshold. In a fourth aspect, alone or in combination with one or more of the first through third aspects, transitioning from the active state to the inactive state comprises transitioning from the active state to the inactive state before a scheduled transition time based at least in part on the satisfaction of the set of threshold conditions. In a fifth aspect, alone or in combination with one or more of the first through fourth aspects, receiving the set of downlink grants or the set of uplink grants comprises receiving one or more burst transmissions identifying the set of downlink grants or the set of uplink grants. In a sixth aspect, alone or in combination with one or more of the first through fifth aspects, the method includes receiving a configuration for CDRX, the configuration indicating at least one threshold condition of the set of threshold conditions, and transitioning from the active state to the inactive state comprises transitioning from a CDRX on duration to a CDRX off duration, before a scheduled expiration of the CDRX on duration, based at least in part on the at least one threshold condition being satisfied.

Some aspects described herein relate to a UE for wireless communication. The UE may include a memory and one or more processors coupled to the memory. The one or more processors may be configured to receive, in an active state, a set of downlink grants or a set of uplink grants. The one or more processors may be configured to transition from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time.

Some aspects described herein relate to a non-transitory computer-readable medium that stores a set of instructions for wireless communication by a UE. The set of instructions, when executed by one or more processors of the UE, may cause the UE to receive, in an active state, a set of downlink grants or a set of uplink grants. The set of instructions, when executed by one or more processors of the UE, may cause the UE to transition from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time.

Some aspects described herein relate to an apparatus for wireless communication. The apparatus may include means for receiving, in an active state, a set of downlink grants or a set of uplink grants. The apparatus may include means for transitioning from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time.

In some aspects, the UE, the one or more processors when executing the set of instructed stored by the non-transitory computer-readable medium, or the apparatus may be configured to perform one or more of the aforementioned aspects described with regard to the method of wireless communication performed by the UE.

Some aspects described herein relate to a method of wireless communication performed by a network entity. The method may include transmitting configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time. The method may include transmitting, in an active state, a set of downlink grants or a set of uplink grants.

In a first aspect, the set of threshold conditions includes the quantity of downlink grants in the set of downlink grants satisfying a threshold. In a second aspect, alone or in combination with the first aspect, the set of threshold conditions includes the quantity of uplink grants in the set of uplink grants satisfying a threshold. In a third aspect, alone or in combination with one or more of the first and second aspects, the set of threshold conditions includes the inactivity time satisfying an inactivity time threshold. In a fourth aspect, alone or in combination with one or more of the first through third aspects, the set of threshold conditions, when satisfied, cause a transition from the active state to the inactive state before a scheduled transition time. In a fifth aspect, alone or in combination with one or more of the first through fourth aspects, transmitting the set of downlink grants or the set of uplink grants comprises transmitting one or more burst transmissions identifying the set of downlink grants or the set of uplink grants. In a sixth aspect, alone or in combination with one or more of the first through fifth aspects, the discontinuous reception mode is a connected discontinuous reception mode.

Some aspects described herein relate to a network entity for wireless communication. The network entity may include a memory and one or more processors coupled to the memory. The one or more processors may be configured to transmit configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time. The one or more processors may be configured to transmit, in an active state, a set of downlink grants or a set of uplink grants.

Some aspects described herein relate to a non-transitory computer-readable medium that stores a set of instructions for wireless communication by a network entity. The set of instructions, when executed by one or more processors of the network entity, may cause the network entity to transmit configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time. The set of instructions, when executed by one or more processors of the network entity, may cause the network entity to transmit, in an active state, a set of downlink grants or a set of uplink grants.

Some aspects described herein relate to an apparatus for wireless communication. The apparatus may include means for transmitting configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time. The apparatus may include means for transmitting, in an active state, a set of downlink grants or a set of uplink grants.

In some aspects, the network entity, the one or more processors when executing the set of instructed stored by the non-transitory computer-readable medium, or the apparatus may be configured to perform one or more of the aforementioned aspects described with regard to the method of wireless communication performed by the network entity.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
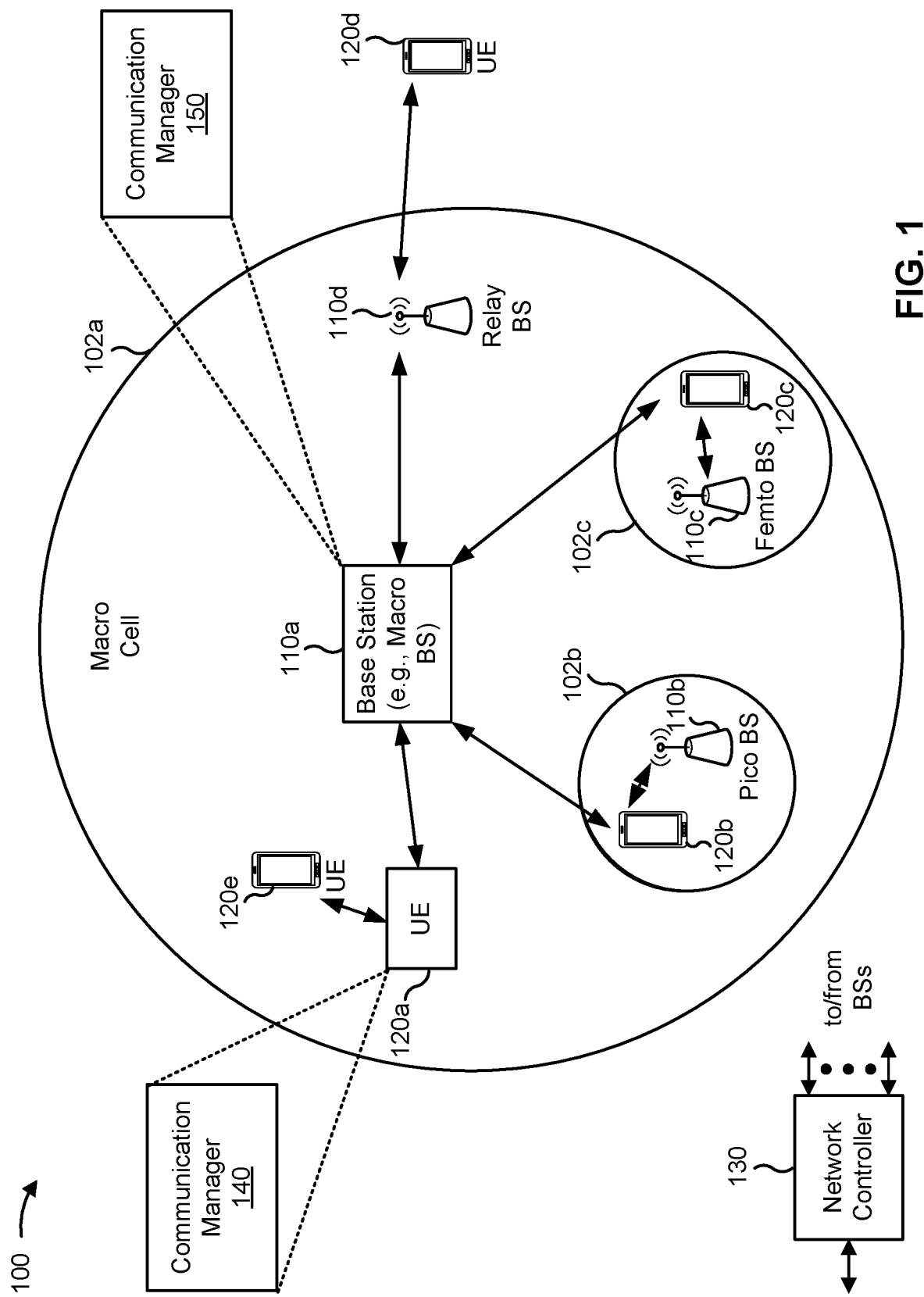
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, in an active state, a set of downlink grants or a set of uplink grants; and transition from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time. Additionally, or alternatively, the communication manager 140 may perform one or more other operations described herein.

In some aspects, a network entity (e.g., the base station 110) may include a communication manager 150. As described in more detail elsewhere herein, the communication manager 150 may transmit configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time; and transmit, in an active state, a set of downlink grants or a set of uplink grants. Additionally, or alternatively, the communication manager 150 may perform one or more other operations described herein.

As indicated above, FIG. 1 is provided as an example. Other examples may differ from what is described with regard to FIG. 1.

Figure 2:
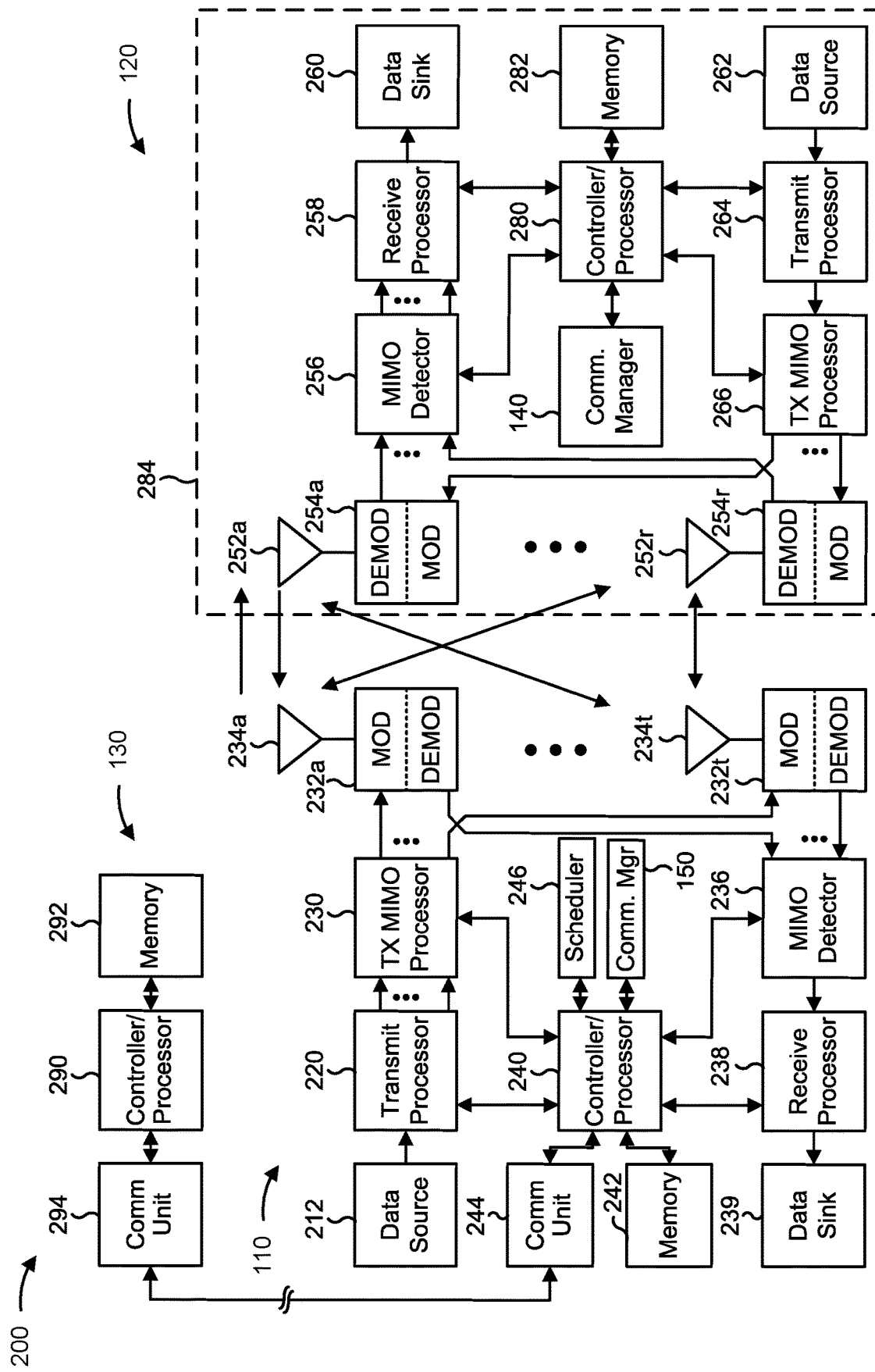
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with discontinuous reception (DRX) in jitter-affected scenarios, as described in more detail elsewhere herein. In some aspects, the network entity described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, in an active state, a set of downlink grants or a set of uplink grants; and/or means for transitioning from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the base station 110) includes means for transmitting configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time; and/or means for transmitting, in an active state, a set of downlink grants or a set of uplink grants. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
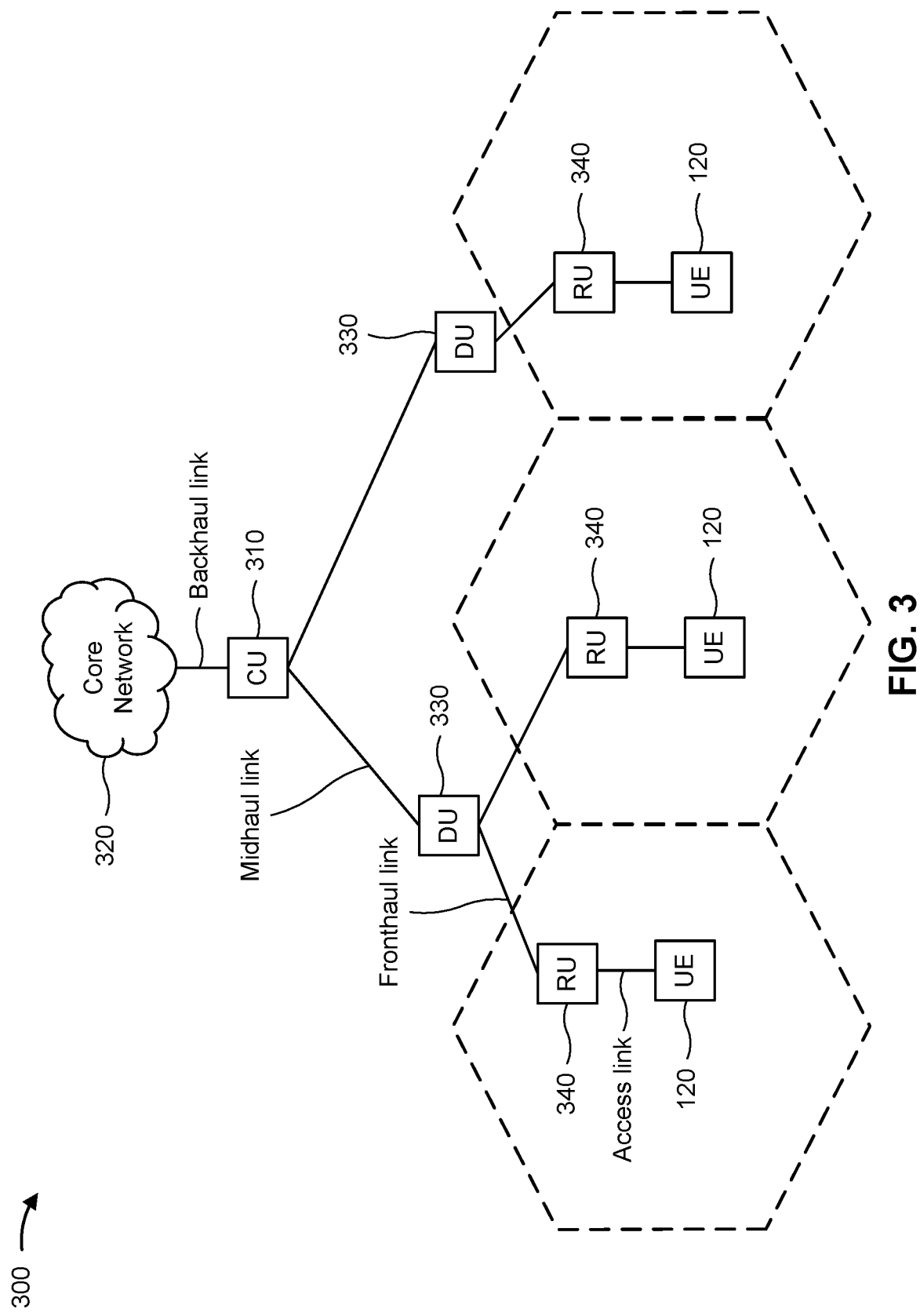
FIG. 3 is a diagram illustrating an example of an open radio access network (O-RAN) architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
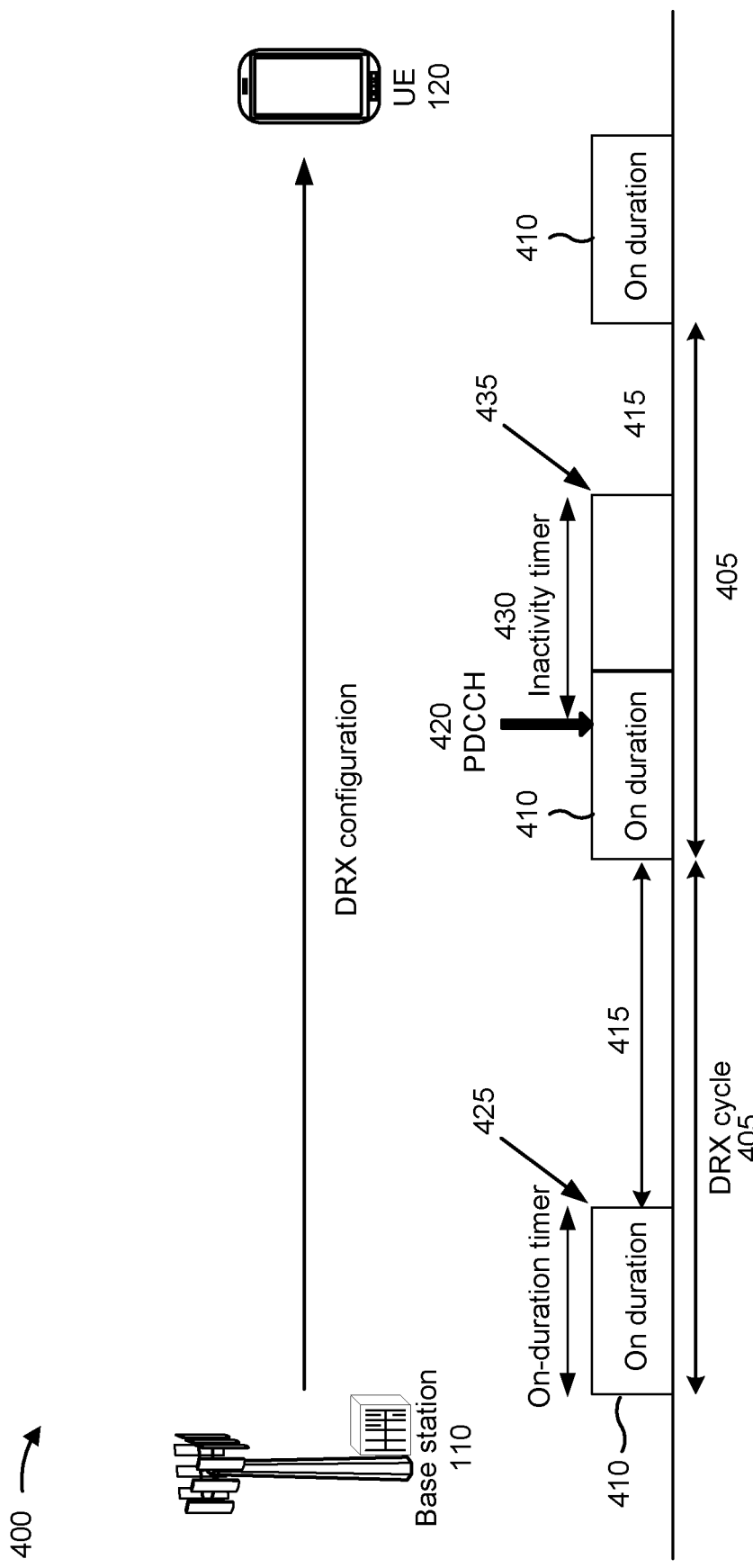
FIG. 4 is a diagram illustrating an example of a discontinuous reception (DRX) configuration, in accordance with the present disclosure.

FIG. 4 is a diagram illustrating an example 400 of a discontinuous reception (DRX) configuration, in accordance with the present disclosure. Examples of DRX configurations include idle mode DRX (I-DRX) and connected mode DRX, which may also be referred to as connected DRX (CDRX) or enhanced or evolved CDRX (eCDRX). Additional details regarding DRX configurations are described with regard to, for example, 3GPP Technical Specification (TS) 36.321, Release 17, Version 17.0.0.

As shown in FIG. 4, a base station 110 may transmit a DRX configuration to a UE 120 to configure a DRX cycle 405 (e.g., a CDRX cycle) for the UE 120. A DRX cycle 405 may include a DRX on duration 410 (e.g., during which a UE 120 is awake or in an active state) and an opportunity to enter a DRX sleep state 415. As used herein, the time during which the UE 120 is configured to be in an active state (or awake state) during the DRX on duration 410 may be referred to as an active time or an awake time, and the time during which the UE 120 is configured to be in the DRX sleep state 415 (or inactive state or off duration) may be referred to as an inactive time or a sleep time. As described below, the UE 120 may monitor a physical downlink control channel (PDCCH) during the active time, and may refrain from monitoring the PDCCH during the inactive time.

During the DRX on duration 410 (e.g., the active time), the UE 120 may monitor a downlink control channel (e.g., a PDCCH), as shown by reference number 420. For example, the UE 120 may monitor the PDCCH for downlink control information (DCI) pertaining to the UE 120. If the UE 120 does not detect and/or successfully decode any PDCCH communications intended for the UE 120 during the DRX on duration 410, then the UE 120 may enter the sleep state 415 (e.g., for the inactive time) at the end of the DRX on duration 410, as shown by reference number 425. In the sleep state 415, the UE 120 may deactivate one or more antennas or antenna panels, processors, or other components (e.g., that are active when the UE 120 is in on duration 410) to reduce power consumption. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 430 (e.g., which may extend the active time). The UE 120 may start the DRX inactivity timer 430 at a time at which the PDCCH communication is received (e.g., in a transmission time interval (TTI) in which the PDCCH communication is received, such as a slot or a subframe). The UE 120 may remain in the active state until the DRX inactivity timer 430 expires, at which time the UE 120 may enter the sleep state 415 (e.g., for the inactive time), as shown by reference number 435. During the duration of the DRX inactivity timer 430, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 430 after each detection of a PDCCH communication for the UE 120 for an initial transmission (e.g., but not for a retransmission). By operating in this manner, the UE 120 may conserve battery power and reduce power consumption by entering the sleep state 415. Although some aspects are described herein in terms of monitoring for a PDCCH communication, other downlink communications are contemplated.

As indicated above, FIG. 4 is provided as an example. Other examples may differ from what is described with respect to FIG. 4.

Figure 5:
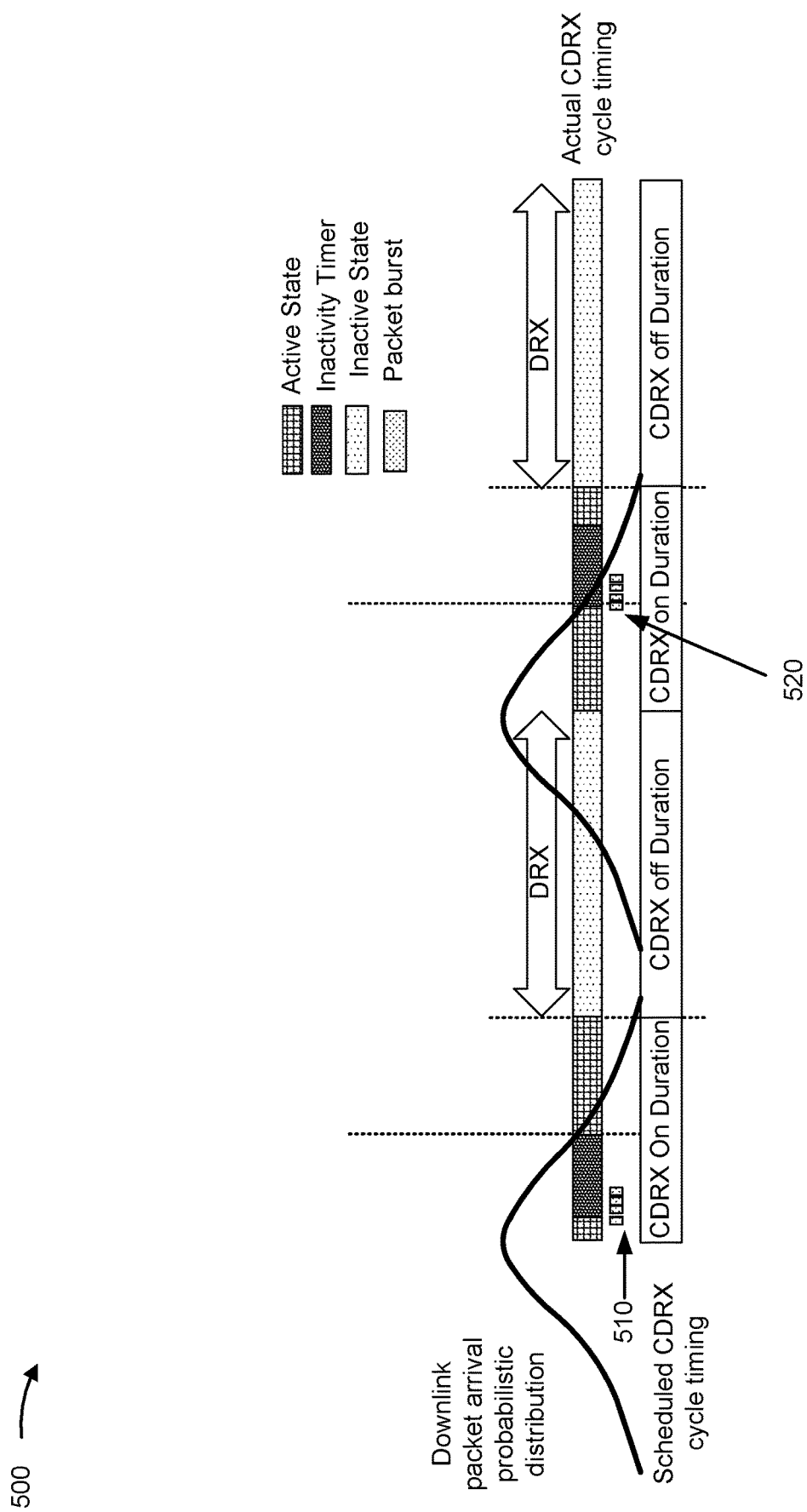
FIG. 5 is a diagram illustrating an example of connected DRX (CDRX) operation in a jitter-affected scenario, in accordance with the present disclosure.

FIG. 5 is a diagram illustrating an example 500 of CDRX operation in a jitter-affected scenario, in accordance with the present disclosure.

As shown in FIG. 5, CDRX operation may include a set of CDRX on durations, in which a UE is configured to receive downlink transmissions, and a set of CDRX off durations, in which the UE is in a power saving mode and is not configured to receive downlink transmissions. Jitter, which may also be referred to as "network jitter," is a variation in time delay between when a signal is transmitted (and scheduled to be received) and when the signal is actually received. Jitter can be a result of network congestion (e.g., insufficient bandwidth for communications occurring on a network), poor hardware performance (e.g., of devices associated with relaying, processing, and transmitting packets), or poor connection quality (e.g., high interference or low signal-to-interference-and-noise-ratio (SINR)), among other examples. Jitter can impact communications by causing packets to be received outside of a monitoring time of a device. For example, jitter can cause a packet to be delayed to outside of a CDRX on duration, which may result in the packet being queued by the network (e.g., one or more network entities) until a next CDRX on duration. Queuing the packet may result in an increased transmission delay.

As shown, a packet arrival time, with jitter taken into account, can be represented as a probabilistic distribution (e.g., for traffic sources that send packets with a fixed periodicity), such as a bell curve (which may also be referred to as a "normal curve"). A timing of CDRX on durations and CDRX off durations can be configured to increase a likelihood of packet receipt in jitter scenarios. For example, the CDRX on duration can be configured (e.g., by a network entity) to include a high percentile of a downlink packet arrival probability, which provides low latency by enabling immediate scheduling for downlink packets. This can result in longer CDRX on durations being configured for high jitter scenarios to encompass wider probabilistic distributions associated with higher levels of jitter.

As shown by reference numbers 510 and 520, when packets are received in a first CDRX on duration and a second CDRX on duration, respectively, an inactivity timer is started. The inactivity timer is associated with indicating whether there are further packets for a UE to receive. However, when the inactivity timer expires, the UE still remains in the CDRX on duration until the CDRX on duration is scheduled to expire. As a result, the UE may continue using excess power resources, even after the UE has finished receiving all packets that were scheduled for the UE, until the CDRX on duration is over and the UE can transition to a power saving mode associated with a CDRX off duration.

As indicated above, FIG. 5 is provided as an example. Other examples may differ from what is described with respect to FIG. 5.

As described above, jitter can result in a probabilistic distribution for a time position in which a periodic data burst (e.g., a set of packets) can be received by a UE. In extended reality (XR) applications with 48 frames per second (FPS), an interval between frames (e.g., from a start of a first frame to a start of a second frame) is configured to be approximately ⅟₄₈ of a second (20.83 milliseconds (ms), but jitter can result in an actual interval between frames being smaller or larger than the configured 20.83 ms (e.g., the actual interval can be in a range of 10 ms and to 30 ms). A CDRX cycle length can be configured to be equal to a traffic periodicity of an application, which may provide power saving while minimizing packet latency. However, when jitter is present, an active part of a CDRX cycle (e.g., the CDRX on duration) needs to be configured to be long enough to cover a tail of the probabilistic distribution for receiving a periodic data burst. In other words, although the interval between frames of XR data is approximately 20 ms, the CDRX on duration may be configured to cover an extra 10 ms in case jitter results in the actual interval being 30 ms for some data bursts corresponding to some frames. This extension of the CDRX on duration increases UE power consumption by causing the UE to remain in an active state longer than is necessary (e.g., in cases where the actual interval is less than 30 ms). Without jitter, a CDRX on duration can be configured to be as small as possible such that a network has allocated available resources to initiate transmission of a data burst within the CDRX on duration (e.g., the CDRX on duration could be only 1 ms to cover 1 ms of data burst). However, with jitter, to ensure data delivery without excessive queuing, the CDRX on duration is configured based on the tail of the aforementioned probability distribution (e.g., to account for the jitter), rather than on an expected availability of resources to schedule data. As a result, jitter scenarios can result in a less efficient use of network resources than may occur in non-jitter scenarios.

Some aspects described herein enable early CDRX state transitioning for jitter-affected scenarios. For example, when a UE determines that one or more threshold conditions are satisfied, the UE may transition from an active state to an inactive state (e.g., before the UE is scheduled to transition from the active state to the inactive state), thereby enabling the UE to enter a power saving mode earlier than if the UE waited until the UE was scheduled to transition from the active state to the inactive state. In other words, when the UE has received a threshold quantity of grants (in a set of grants) (e.g., uplink grants or downlink grants) and/or an inactivity timer is expired (indicating that the UE has finished receiving a complete data burst for the CDRX on duration), the UE may transition to an inactive state before the 30 ms has expired, rather than wait for the full 30 ms to expire, as described above. In this way, the UE reduces power consumption without negatively impacting latency, for, for example, communications applications that include periodic, short burst traffic patterns, such as XR, virtual reality (VR), augmented reality (AR), or Voice over Internet Protocol (VoIP), among other examples.

Figure 6:
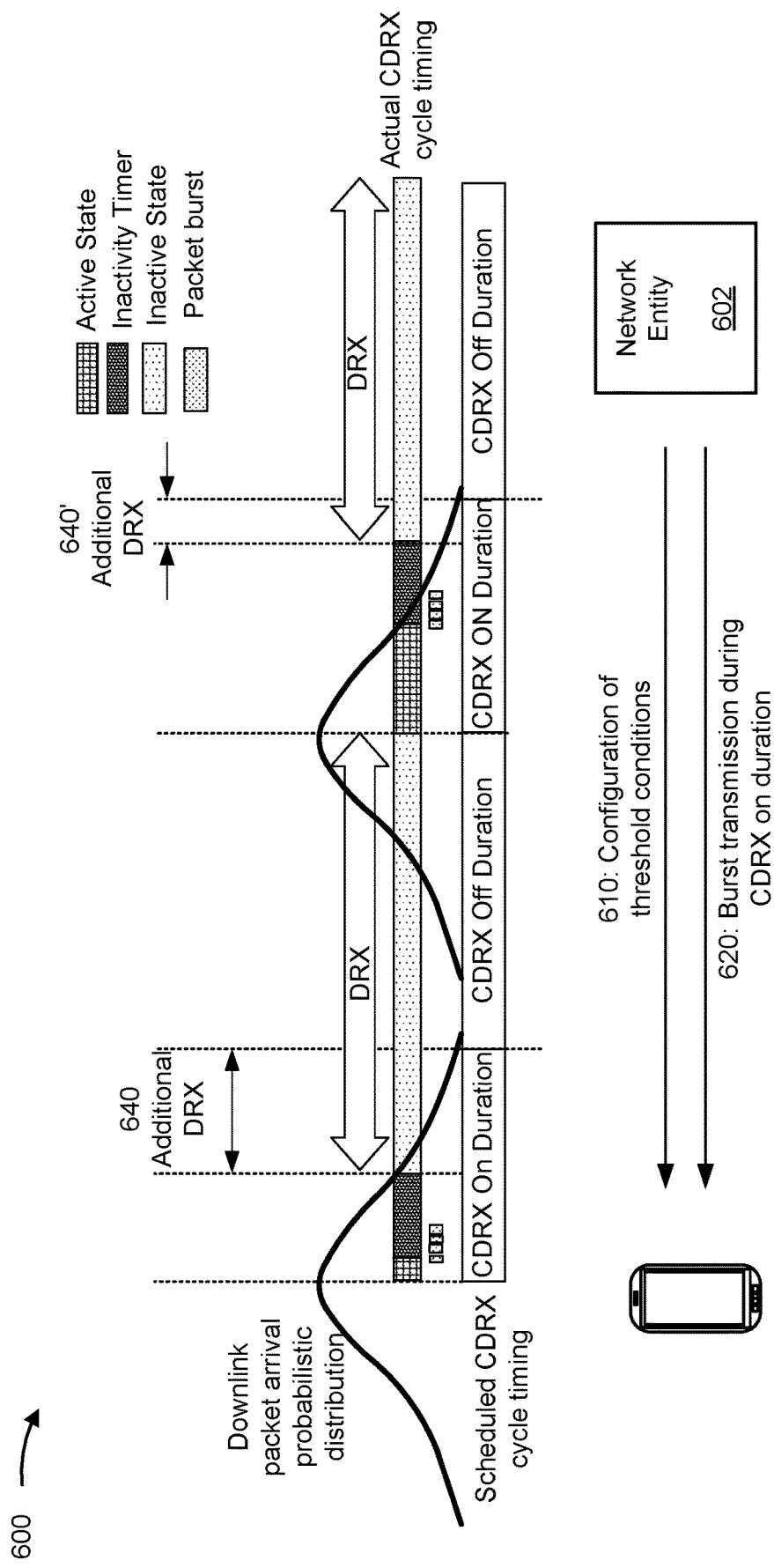
FIG. 6 is a diagram illustrating an example associated with CDRX operation in a jitter-affected scenario, in accordance with the present disclosure.

FIG. 6 is a diagram illustrating an example 600 associated with CDRX operation in a jitter-affected scenario, in accordance with the present disclosure. As shown in FIG. 6, example 600 may include a UE 120 communicating with a network entity 602 in a CDRX mode.

As further shown in FIG. 6, and by reference number 610, the UE 120 may receive, from the network entity 602, configuration information identifying a configuration for a set of threshold conditions. For example, the UE 120 may receive information identifying the set of threshold conditions, such as which conditions to use to cause an early state transition (e.g., an early transition to a CDRX off duration). Additionally, or alternatively, the UE 120 may receive information identifying a value for one or more threshold conditions. For example, the UE 120 may receive information identifying a minimum quantity of downlink grants that the UE 120 is to receive before an early state transition. Additionally, or alternatively, the UE 120 may receive information identifying a minimum quantity of uplink grants before an early state transition. Additionally, or alternatively, the UE 120 may receive information identifying a length of an inactivity timer (e.g., a quantity of slots).

In some aspects, network entity 602 may provide information identifying values for the one or more threshold conditions, when may enable the UE 120 to derive which threshold conditions to evaluate. For example, when the UE 120 does not receive a value for a threshold condition, the UE 120 may determine not to evaluate the condition (the condition is always satisfied). Similarly, when the UE 120 receives a value of 0 (e.g., for the quantity of uplink or downlink grants) the UE 120 may determine not to evaluate the condition (the condition is always satisfied). Although some aspects are described herein in terms of a particular set of threshold conditions, other threshold conditions may be possible. In some aspects, the UE 120 may use stored or static configuration information for the set of threshold conditions (e.g., rather than receiving configuration information from network entity 602).

As further shown in FIG. 6, and by reference numbers 620 and 630, the UE 120 may communicate with the network entity 602 during a CDRX on duration and determine whether the set of threshold conditions are satisfied. For example, the UE 120 may receive a burst transmission of a set of packets during the on duration. In this case, the UE 120 may determine whether a quantity of uplink grants satisfies a threshold, a quantity of downlink grants satisfies a threshold, and/or an inactivity timer is elapsed (e.g., the UE 120 may determine whether one or all of the threshold conditions are satisfied based at least in part on a configuration for the set of threshold conditions).

In some aspects, based at least in part on the set of threshold conditions being satisfied, the UE 120 may transition from an active state associated with a CDRX on duration to an inactive state associated with a CDRX off duration before the CDRX off duration is scheduled to start. For example, as shown by reference numbers 640 and 640', after expiration of the inactivity timer that is started when the UE 120 receives a packet burst, and/or after satisfaction of one or more other threshold conditions, the UE 120 may transition to the inactive state. In this case, the UE 120 transitions to the inactive state before the UE 120 is scheduled to transition to the inactive state in connection with an occurrence of a CDRX off duration, thereby reducing power consumption without negatively impacting latency relative to a fixed CDRX cycle (where the scheduled CDRX cycle timing matches the actual CDRX cycle timing). For example, in some use cases, power consumption may be 20% reduced for 30 FPS XR and 13% for 48 FPS XR without a negative impact to packet latency.

As indicated above, FIG. 6 is provided as an example. Other examples may differ from what is described with respect to FIG. 6.

Figure 7:
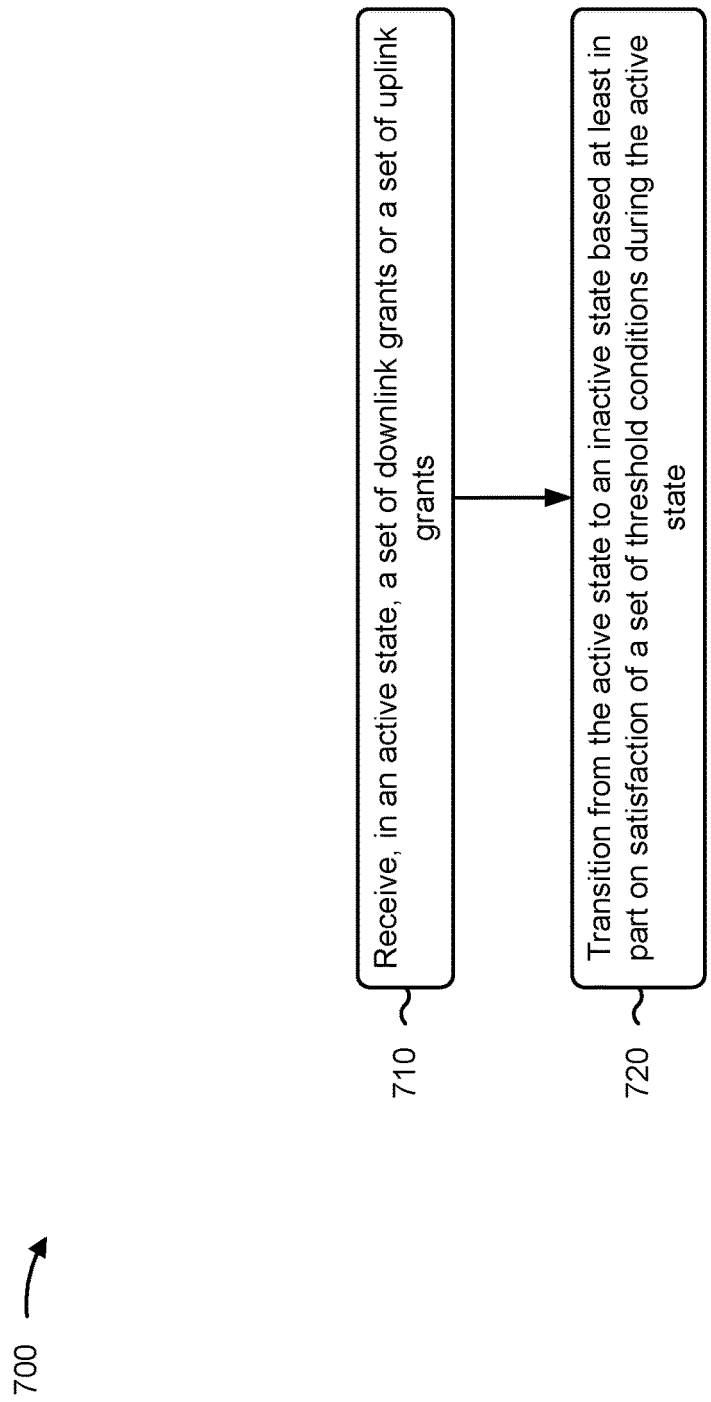
FIGS. 7-8 are diagrams illustrating example processes associated with CDRX operation in a jitter-affected scenario, in accordance with the present disclosure.

FIG. 7 is a diagram illustrating an example process 700 performed, for example, by a UE, in accordance with the present disclosure. Example process 700 is an example where the UE (e.g., UE 120) performs operations associated with discontinuous reception in jitter-affected scenarios.

As shown in FIG. 7, in some aspects, process 700 may include receiving, in an active state, a set of downlink grants or a set of uplink grants (block 710). For example, the UE (e.g., using communication manager 140 and/or reception component 902, depicted in FIG. 9) may receive, in an active state, a set of downlink grants or a set of uplink grants, as described above.

As further shown in FIG. 7, in some aspects, process 700 may include transitioning from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time (block 720). For example, the UE (e.g., using communication manager 140 and/or state transition component 908, depicted in FIG. 9) may transition from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time, as described above.

Process 700 may include additional aspects, such as any single aspect or any combination of aspects described below and/or in connection with one or more other processes described elsewhere herein.

With respect to process 700, in a first aspect, the set of threshold conditions includes the quantity of downlink grants in the set of downlink grants satisfying a threshold.

With respect to process 700, in a second aspect, alone or in combination with the first aspect, the set of threshold conditions includes the quantity of uplink grants in the set of uplink grants satisfying a threshold.

With respect to process 700, in a third aspect, alone or in combination with one or more of the first and second aspects, the set of threshold conditions includes the inactivity time satisfying an inactivity time threshold.

With respect to process 700, in a fourth aspect, alone or in combination with one or more of the first through third aspects, transitioning from the active state to the inactive state comprises transitioning from the active state to the inactive state before a scheduled transition time based at least in part on the satisfaction of the set of threshold conditions.

With respect to process 700, in a fifth aspect, alone or in combination with one or more of the first through fourth aspects, receiving the set of downlink grants or the set of uplink grants comprises receiving one or more burst transmissions identifying the set of downlink grants or the set of uplink grants.

With respect to process 700, in a sixth aspect, alone or in combination with one or more of the first through fifth aspects, process 700 includes receiving a configuration for CDRX, the configuration indicating at least one threshold condition of the set of threshold conditions, and transitioning from the active state to the inactive state comprises transitioning from a CDRX on duration to a CDRX off duration, before a scheduled expiration of the CDRX on duration, based at least in part on the at least one threshold condition being satisfied.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
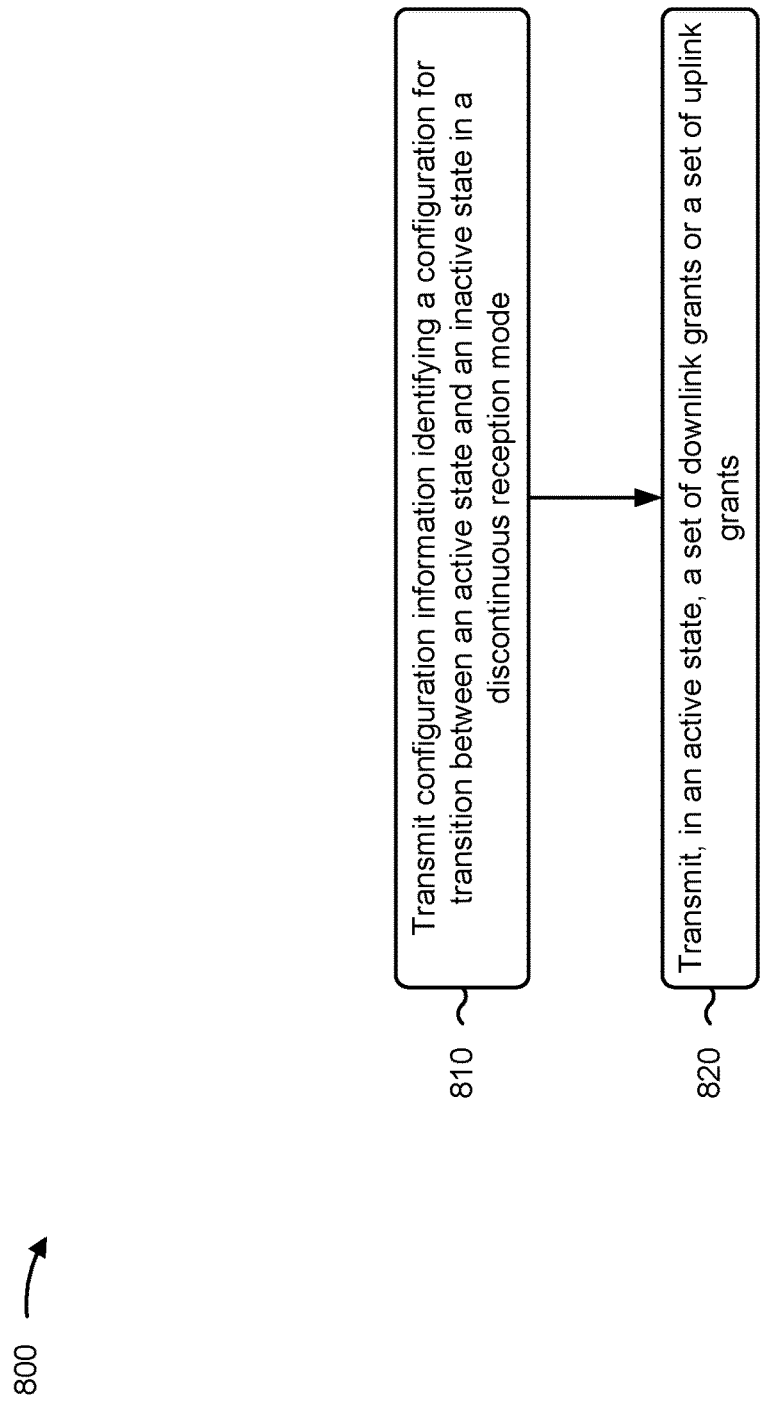

FIG. 8 is a diagram illustrating an example process 800 performed, for example, by a network entity, in accordance with the present disclosure. Example process 800 is an example where the network entity (e.g., the base station 110, the CU 310, the DU 330, the RU 340, or network entity 602, among other examples) performs operations associated with discontinuous reception in jitter-affected scenarios.

As shown in FIG. 8, in some aspects, process 800 may include transmitting configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time (block 810). For example, the network entity (e.g., using communication manager 150 and/or transmission component 1004, depicted in FIG. 10) may transmit configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time, as described above.

As further shown in FIG. 8, in some aspects, process 800 may include transmitting, in an active state, a set of downlink grants or a set of uplink grants (block 820). For example, the network entity (e.g., using communication manager 150 and/or transmission component 1004, depicted in FIG. 10) may transmit, in an active state, a set of downlink grants or a set of uplink grants, as described above.

Process 800 may include additional aspects, such as any single aspect or any combination of aspects described below and/or in connection with one or more other processes described elsewhere herein.

With respect to process 800, in a first aspect, the set of threshold conditions includes the quantity of downlink grants in the set of downlink grants satisfying a threshold.

With respect to process 800, in a second aspect, alone or in combination with the first aspect, the set of threshold conditions includes the quantity of uplink grants in the set of uplink grants satisfying a threshold.

With respect to process 800, in a third aspect, alone or in combination with one or more of the first and second aspects, the set of threshold conditions includes the inactivity time satisfying an inactivity time threshold.

With respect to process 800, in a fourth aspect, alone or in combination with one or more of the first through third aspects, the set of threshold conditions, when satisfied, cause a transition from the active state to the inactive state before a scheduled transition time.

With respect to process 800, in a fifth aspect, alone or in combination with one or more of the first through fourth aspects, transmitting the set of downlink grants or the set of uplink grants comprises transmitting one or more burst transmissions identifying the set of downlink grants or the set of uplink grants.

With respect to process 800, in a sixth aspect, alone or in combination with one or more of the first through fifth aspects, the discontinuous reception mode is a connected discontinuous reception mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
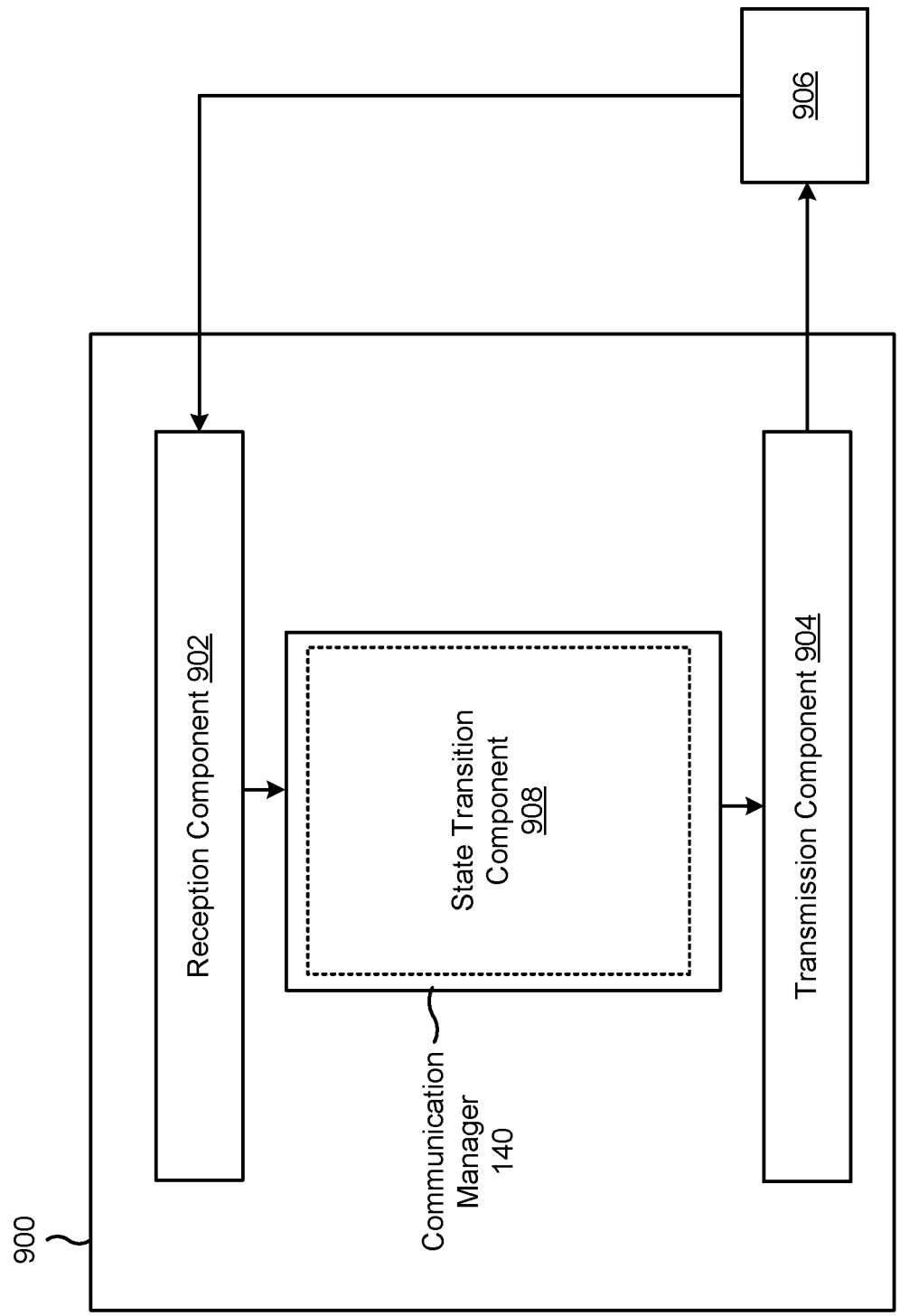
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a state transition component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, in an active state, a set of downlink grants or a set of uplink grants. The state transition component 908 may transition the apparatus 900 from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time. The reception component 902 may receive a configuration for CDRX, the configuration indicating at least one threshold condition of the set of threshold conditions.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
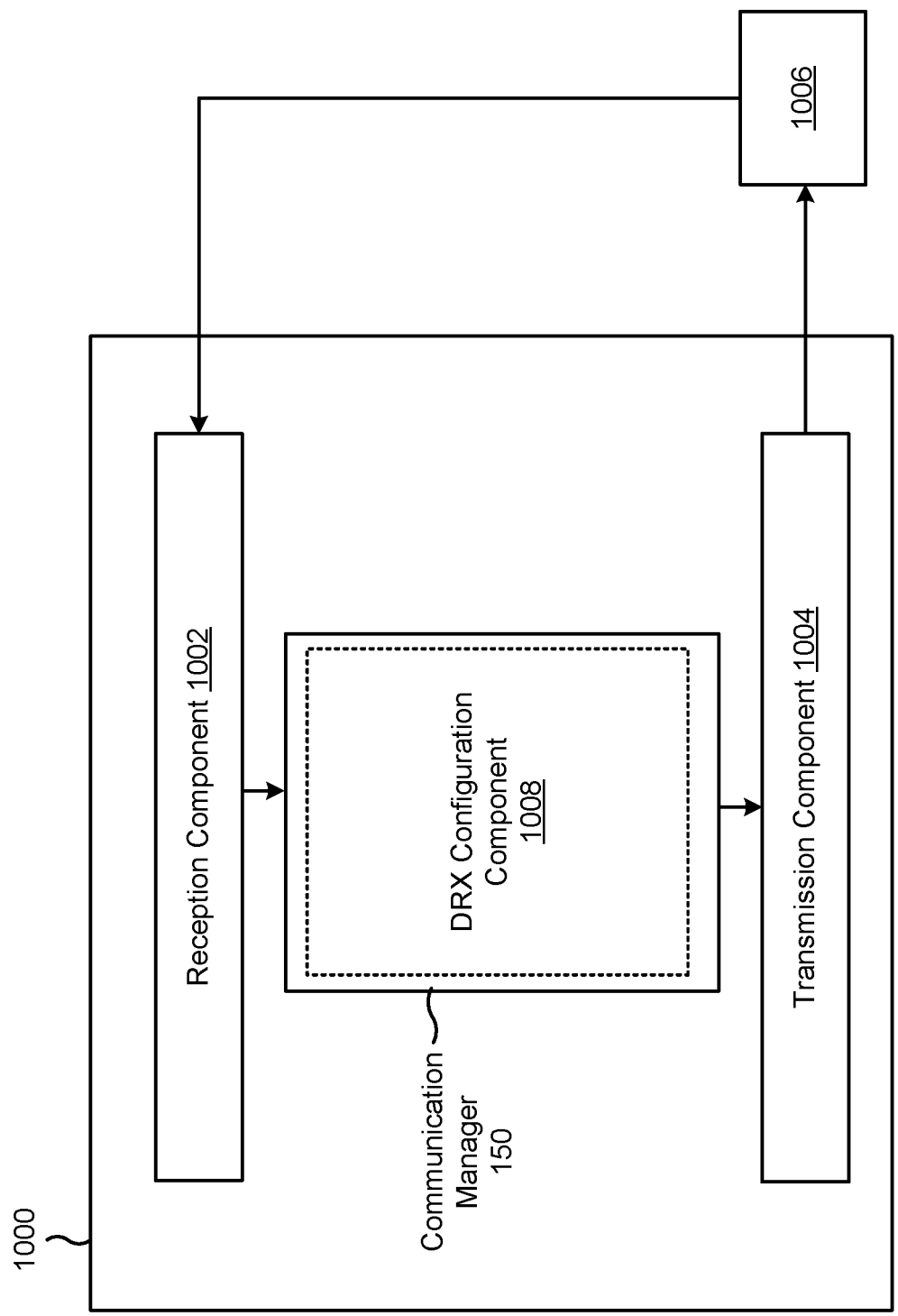

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a DRX configuration component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time. The transmission component 1004 may transmit, in an active state, a set of downlink grants or a set of uplink grants. The DRX configuration component 1008 may configure one or more threshold conditions that the apparatus 1006 is to evaluate to determine whether to transition from an active state to an inactive state before a scheduled transition to the inactive state.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, in an active state, a set of downlink grants or a set of uplink grants; and transitioning from the active state to an inactive state based at least in part on satisfaction of a set of threshold conditions during the active state, the set of threshold conditions including at least one of a quantity of downlink grants in the set of downlink grants, a quantity of uplink grants in the set of uplink grants, or an inactivity time.

Aspect 2: The method of Aspect 1, wherein the set of threshold conditions includes the quantity of downlink grants in the set of downlink grants satisfying a threshold.

Aspect 3: The method of any of Aspects 1 to 2, wherein the set of threshold conditions includes the quantity of uplink grants in the set of uplink grants satisfying a threshold.

Aspect 4: The method of any of Aspects 1 to 3, wherein the set of threshold conditions includes the inactivity time satisfying an inactivity time threshold.

Aspect 5: The method of any of Aspects 1 to 4, wherein transitioning from the active state to the inactive state comprises: transitioning from the active state to the inactive state before a scheduled transition time based at least in part on the satisfaction of the set of threshold conditions.

Aspect 6: The method of any of Aspects 1 to 5, wherein receiving the set of downlink grants or the set of uplink grants comprises: receiving one or more burst transmissions identifying the set of downlink grants or the set of uplink grants.

Aspect 7: The method of any of Aspects 1 to 6, further comprising: receiving a configuration for connected discontinuous reception (CDRX), the configuration indicating at least one threshold condition of the set of threshold conditions; and wherein transitioning from the active state to the inactive state comprises: transitioning from a CDRX on duration to a CDRX off duration, before a scheduled expiration of the CDRX on duration, based at least in part on the at least one threshold condition being satisfied.

Aspect 8: A method of wireless communication performed by a network entity, comprising: transmitting configuration information identifying a configuration for transition between an active state and an inactive state in a discontinuous reception mode, the configuration information identifying a configuration relating to a set of threshold conditions, the set of threshold conditions including at least one of a quantity of downlink grants in the set of downlink grants, a quantity of uplink grants in the set of uplink grants, or an inactivity time; and transmitting, in an active state, a set of downlink grants or a set of uplink grants.

Aspect 9: The method of Aspect 8, wherein the set of threshold conditions includes the quantity of downlink grants in the set of downlink grants satisfying a threshold.

Aspect 10: The method of any of Aspects 8 to 9, wherein the set of threshold conditions includes the quantity of uplink grants in the set of uplink grants satisfying a threshold.

Aspect 11: The method of any of Aspects 8 to 10, wherein the set of threshold conditions includes the inactivity time satisfying an inactivity time threshold.

Aspect 12: The method of any of Aspects 8 to 11, wherein the set of threshold conditions, when satisfied, cause a transition from the active state to the inactive state before a scheduled transition time.

Aspect 13: The method of any of Aspects 8 to 12, wherein transmitting the set of downlink grants or the set of uplink grants comprises: transmitting one or more burst transmissions identifying the set of downlink grants or the set of uplink grants.

Aspect 14: The method of any of Aspects 8 to 13, wherein the discontinuous reception mode is a connected discontinuous reception mode.

Aspect 15: An apparatus for wireless communication at a device, comprising a processor; memory coupled with the processor; and instructions stored in the memory and executable by the processor to cause the apparatus to perform the method of one or more of Aspects 1-7.

Aspect 16: A device for wireless communication, comprising a memory and one or more processors coupled to the memory, the one or more processors configured to perform the method of one or more of Aspects 1-7.

Aspect 17: An apparatus for wireless communication, comprising at least one means for performing the method of one or more of Aspects 1-7.

Aspect 18: A non-transitory computer-readable medium storing code for wireless communication, the code comprising instructions executable by a processor to perform the method of one or more of Aspects 1-7.

Aspect 19: A non-transitory computer-readable medium storing a set of instructions for wireless communication, the set of instructions comprising one or more instructions that, when executed by one or more processors of a device, cause the device to perform the method of one or more of Aspects 1-7.

Aspect 15: An apparatus for wireless communication at a device, comprising a processor; memory coupled with the processor; and instructions stored in the memory and executable by the processor to cause the apparatus to perform the method of one or more of Aspects 8-14.

Aspect 16: A device for wireless communication, comprising a memory and one or more processors coupled to the memory, the one or more processors configured to perform the method of one or more of Aspects 8-14.

Aspect 17: An apparatus for wireless communication, comprising at least one means for performing the method of one or more of Aspects 8-14.

Aspect 18: A non-transitory computer-readable medium storing code for wireless communication, the code comprising instructions executable by a processor to perform the method of one or more of Aspects 8-14.

Aspect 19: A non-transitory computer-readable medium storing a set of instructions for wireless communication, the set of instructions comprising one or more instructions that, when executed by one or more processors of a device, cause the device to perform the method of one or more of Aspects 8-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, in an active state, a set of downlink grants or a set of uplink grants; and
transition from the active state to an inactive state before a scheduled transition time based at least in part on satisfaction of a set of threshold conditions during the active state,
wherein the set of threshold conditions includes at least one of receiving a quantity of downlink grants in the set of downlink grants or receiving a quantity of uplink grants in the set of uplink grants.

2. The apparatus of claim 1, wherein the set of threshold conditions includes the quantity of downlink grants in the set of downlink grants satisfying a threshold.

3. The apparatus of claim 1, wherein the set of threshold conditions includes the quantity of uplink grants in the set of uplink grants satisfying a threshold.

4. The apparatus of claim 1, wherein the set of threshold conditions includes an inactivity time satisfying an inactivity time threshold.

5. The apparatus of claim 1, wherein the one or more processors, to receive the set of downlink grants or the set of uplink grants, are configured to:
receive one or more burst transmissions identifying the set of downlink grants or the set of uplink grants.

6. The apparatus of claim 1, wherein the one or more processors are further configured to:
receive a configuration for connected discontinuous reception (CDRX), the configuration indicating at least one threshold condition of the set of threshold conditions; and
wherein the one or more processors, to transition from the active state to the inactive state, are configured to:
transition from a CDRX on duration to a CDRX off duration, before a scheduled expiration of the CDRX on duration, based at least in part on the at least one threshold condition being satisfied.

7. The apparatus of claim 1, wherein the one or more processors, to transition from the active state to the inactive state, are configured to:
transition from the active state to the inactive state when the UE has received the quantity of downlink grants or when the UE has received the quantity of uplink grants.

8. The apparatus of claim 1, wherein the quantity of downlink grants is a minimum quantity of downlink grants to transition to the inactive state or the quantity of uplink grants is a minimum quantity of uplink grants to transition to the inactive state.

9. An apparatus for wireless communication at a network entity, comprising:
one or more memories; and
one or more processors, coupled to the one or more memories, configured to:
transmit configuration information identifying a configuration for transition between an active state and an inactive state in a discontinuous reception mode before a scheduled transition time, the configuration information identifying a configuration relating to a set of threshold conditions,
wherein the set of threshold conditions includes at least one of receiving a quantity of downlink grants in the set of downlink grants or receiving a quantity of uplink grants in the set of uplink grants; and
transmit, in an active state, a set of downlink grants or a set of uplink grants.

10. The apparatus of claim 9, wherein the set of threshold conditions includes the quantity of downlink grants in the set of downlink grants satisfying a threshold.

11. The apparatus of claim 9, wherein the set of threshold conditions includes the quantity of uplink grants in the set of uplink grants satisfying a threshold.

12. The apparatus of claim 9, wherein the set of threshold conditions includes an inactivity time satisfying an inactivity time threshold.

13. The apparatus of claim 9, wherein the one or more processors, to transmit the set of downlink grants or the set of uplink grants, are configured to:
transmit one or more burst transmissions identifying the set of downlink grants or the set of uplink grants.

14. The apparatus of claim 9, wherein the discontinuous reception mode is a connected discontinuous reception mode.

15. A method of wireless communication performed by an apparatus of a user equipment (UE), comprising:
receiving, in an active state, a set of downlink grants or a set of uplink grants; and
transitioning from the active state to an inactive state before a scheduled transition time based at least in part on satisfaction of a set of threshold conditions during the active state,
wherein the set of threshold conditions includes at least one of receiving a quantity of downlink grants in the set of downlink grants or receiving a quantity of uplink grants in the set of uplink grants.

16. The method of claim 15, wherein the set of threshold conditions includes the quantity of downlink grants in the set of downlink grants satisfying a threshold.

17. The method of claim 15, wherein the set of threshold conditions includes the quantity of uplink grants in the set of uplink grants satisfying a threshold.

18. The method of claim 15, wherein the set of threshold conditions includes an inactivity time satisfying an inactivity time threshold.

19. The method of claim 15, wherein receiving the set of downlink grants or the set of uplink grants comprises:
receiving one or more burst transmissions identifying the set of downlink grants or the set of uplink grants.

20. The method of claim 15, further comprising:
receiving a configuration for connected discontinuous reception (CDRX), the configuration indicating at least one threshold condition of the set of threshold conditions; and
wherein transitioning from the active state to the inactive state comprises:
transitioning from a CDRX on duration to a CDRX off duration, before a scheduled expiration of the CDRX on duration, based at least in part on the at least one threshold condition being satisfied.

21. The method of claim 15, wherein transitioning from the active state to the inactive state comprises:
transitioning from the active state to the inactive state when the UE has received the quantity of downlink grants or when the UE has received the quantity of uplink grants.

22. The method of claim 15, wherein the quantity of downlink grants is a minimum quantity of downlink grants to transition to the inactive state or the quantity of uplink grants is a minimum quantity of uplink grants to transition to the inactive state.

23. A method of wireless communication performed by an apparatus of a network entity, comprising:
   transmitting configuration information identifying a configuration for transition between an active state and an inactive state in a discontinuous reception mode before a scheduled transition time, the configuration information identifying a configuration relating to a set of threshold conditions,
   wherein the set of threshold conditions includes at least one of receiving a quantity of downlink grants in the set of downlink grants or receiving a quantity of uplink grants in the set of uplink grants; and
   transmitting, in an active state, a set of downlink grants or a set of uplink grants.

24. The method of claim 23, wherein the set of threshold conditions includes the quantity of downlink grants in the set of downlink grants satisfying a threshold.

25. The method of claim 23, wherein the set of threshold conditions includes the quantity of uplink grants in the set of uplink grants satisfying a threshold.

26. The method of claim 23, wherein the set of threshold conditions includes an inactivity time satisfying an inactivity time threshold.

27. The method of claim 23, wherein transmitting the set of downlink grants or the set of uplink grants comprises:
   transmitting one or more burst transmissions identifying the set of downlink grants or the set of uplink grants.

28. The method of claim 23, wherein the discontinuous reception mode is a connected discontinuous reception mode.

* * * * *